(12) United States Patent
Nagahata et al.

(10) Patent No.: US 8,242,186 B2
(45) Date of Patent: Aug. 14, 2012

(54) LACTIC ACID OLIGOMER AND METHOD FOR PRODUCING THE SAME

(75) Inventors: Ritsuko Nagahata, Ibaraki (JP);
Masako Momotake, Ibaraki (JP);
Kazuhiko Takeuchi, Ibaraki (JP);
Takashi Nakamura, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 212 days.

(21) Appl. No.: 12/451,494

(22) PCT Filed: Dec. 19, 2007

(86) PCT No.: PCT/JP2007/074420
§ 371 (c)(1),
(2), (4) Date: Nov. 16, 2009

(87) PCT Pub. No.: WO2008/139658
PCT Pub. Date: Nov. 20, 2008

(65) Prior Publication Data
US 2010/0125110 A1    May 20, 2010

(30) Foreign Application Priority Data

May 16, 2007 (JP) ................................ 2007-130256
Nov. 13, 2007 (JP) ................................ 2007-294465

(51) Int. Cl.
*C08J 3/28* (2006.01)
*C08G 63/78* (2006.01)
*C08L 101/16* (2006.01)

(52) U.S. Cl. ......................................... 522/84; 524/845
(58) Field of Classification Search .................. 522/84, 522/182; 524/845
See application file for complete search history.

(56) References Cited

U.S. PATENT DOCUMENTS

| | | | |
|---|---|---|---|
| 5,747,635 A * | 5/1998 | Kroner et al. | ................. 528/328 |
| 6,875,839 B2 * | 4/2005 | Gerking et al. | ................. 528/354 |
| 7,019,106 B2 * | 3/2006 | Yamamoto et al. | ............ 528/354 |
| 2004/0258657 A1 * | 12/2004 | Watanabe et al. | .......... 424/78.37 |
| 2005/0222379 A1 * | 10/2005 | Matsuo et al. | ................. 528/359 |

FOREIGN PATENT DOCUMENTS

CN    1325913    12/2001
JP    37-13895    10/1960

OTHER PUBLICATIONS

International Search Report issued Mar. 4, 2008 in International (PCT) Application No. PCT/JP2007/074420.

(Continued)

*Primary Examiner* — Susan W Berman
(74) *Attorney, Agent, or Firm* — Wenderoth, Lind & Ponack, L.L.P.

(57) ABSTRACT

In a method for producing a lactic acid oligomer by subjecting an aqueous lactic acid solution to a polycondensation reaction under microwave irradiation, the polycondensation reaction is carried out under reduced pressure in the absence of a polymerization catalyst and an organic solvent. An initial polycondensation reaction is carried out under normal pressure, and thereafter, a reaction is carried out under reduced pressure. The pressure is reduced stepwise to give a final pressure of 2000 Pa or less. A lactic acid oligomer which has a high purity and is safe from hygiene point of view can be obtained at a low cost in a short time.

3 Claims, 5 Drawing Sheets

OTHER PUBLICATIONS

H. Tsuji et al., "Poly(lactic acid) for the Medical Treatment, the Drug Product and the Environment", Kobunshi Kankokai, pp. 14-15, Sep. 20, 1997, in Japanese language along with partial translation.

S. Keki et al., "Fast Microwave-Mediated Bulk Polycondensation of D, L-Lactic Acid", Macromolecular Rapid Communications, vol. 22, No. 13, pp. 1063-1065, 2001.

M. Murakami et al., "Oligo (Lactic Acid): The Possibility of Development as a Medicine or Functional Food Against Lifestyle-Related Diseases", Journal of Pharmacy, vol. 126(3), pp. 28-31, Oct. 1, 2006 with partial translation.

R. Nagahata et al., "Microwave-Assisted Single-Step Synthesis of Poly(lactic acid) by Direct Polycondensation of Lactic Acid", Macromolecular Rapid Communications, vol. 28, pp. 437-442, 2007.

* cited by examiner

LACTIC ACID OLIGOMER AND METHOD FOR PRODUCING THE SAME

This application is a U.S. national stage of International Application No. PCT/JP2007/074420 filed Dec. 19, 2007.

TECHNICAL FIELD

The present invention relates to a method for easily producing a lactic acid oligomer from lactic acid.

BACKGROUND ART

For the purpose of extending the healthy lives of people and of improving quality of life, Ministry of Health, Labour and Welfare has drawn up "Healthy Japan 21" that is a national health promotion campaign in this century, and has taken various measures to aim at its realization. Accordingly, the development of safe and effective pharmaceutical preparations, various medicinal/therapeutic materials, health foods, and supplements is proceeding, among which synthetic polymers are expected to be utilizable since they can be easily synthesized in compliance with given functions to exhibit higher performance, as compared with natural products.

Among poly(lactic acid) synthesized from lactic acid as a raw material which is obtained from various plants such as corns and sugarcanes, high-molecular-weight poly(lactic acid) products (molecular weight of tens of thousands to hundred thousand) are utilized in large amounts as biomass plastics in the form of various molded products. These high-molecular-weight products are biodegradable and enzymatically hydrolyzed in the living body, and their degradation product, lactic acid, is further metabolized in tissues and oxidized to carbon dioxide. By utilizing this characteristic, therefore, these products are used in absorbable surgical sutures or in sustained release pharmaceutical carriers such as pellets or microcapsules for antitumor agents, hormones etc.

Figure 5:
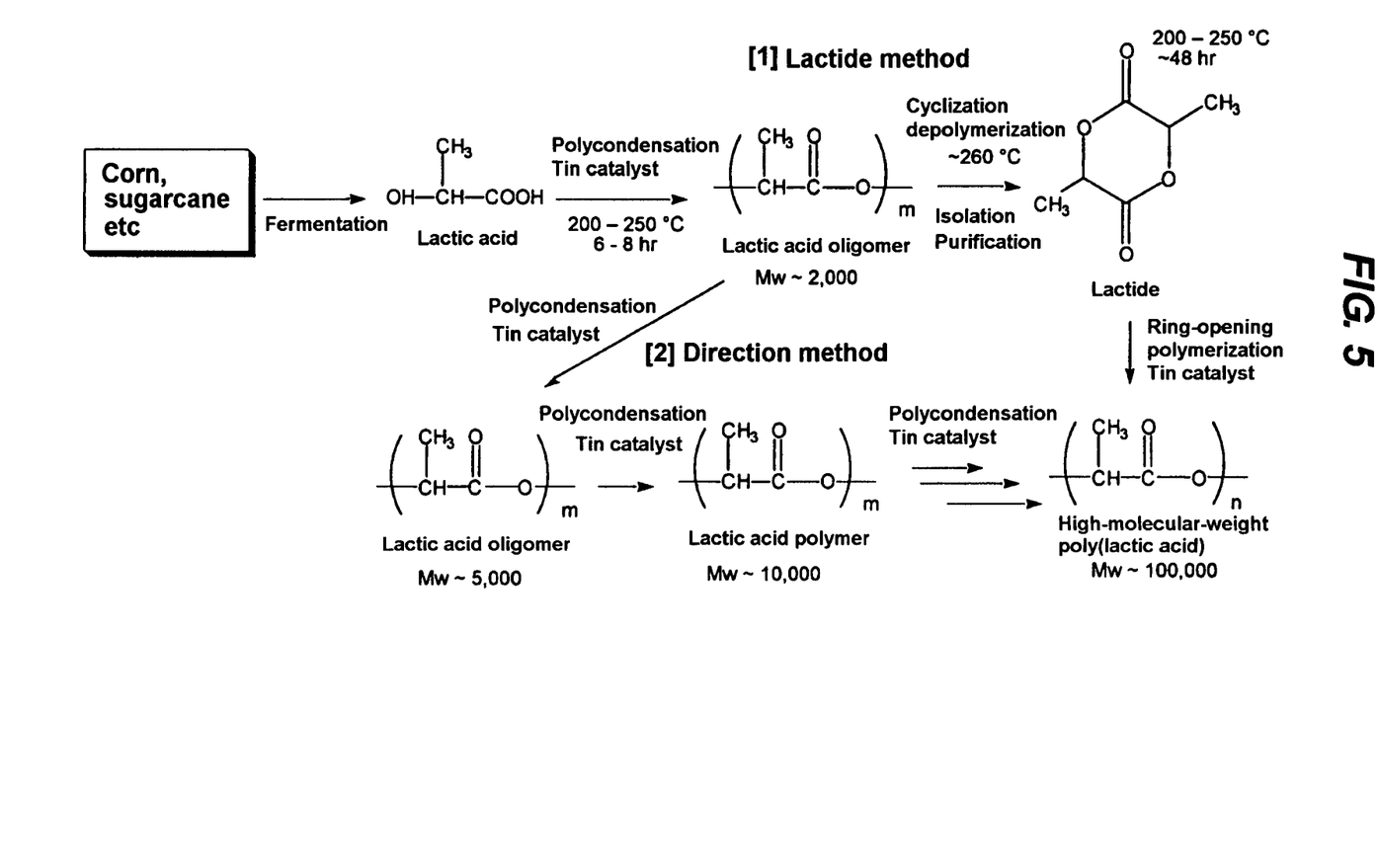
FIG. 5 is a diagram showing methods for synthesizing poly(lactic acid).

Conventionally, as shown in FIG. 5, such poly(lactic acid) (molecular weight of tens of thousands to hundred thousand) has been produced basically by the following 2 methods.

The first method is called a lactide method wherein lactic acid is used as a raw material to once synthesize an oligomer having a molecular weight of about 2000 with a tin compound or the like as a catalyst, and then the oligomer is subjected to heating/cyclization depolymerization to synthesize a cyclic dimer (lactide) which is then isolated and purified, followed by ring-opening polymerization of the lactide with a catalyst such as tin to synthesize poly(lactic acid).

The second method is called a direct method wherein lactic acid is similarly used as a raw material to once synthesize an oligomer having a molecular weight of about 2000 with a tin compound or the like as a catalyst, and then the oligomer is heated and dehydrated in the presence of a catalyst such as tin to synthesize a polymer having a molecular weight of several thousands which is then further subjected to thermal dehydration reactions in several stages to synthesize poly(lactic acid).

However, both these production methods usually involve reaction under a reduced pressure of 13 to 2700 Pa at a high temperature of 180 to 270° C. for one day to ten-odd days to synthesize poly(lactic acid), which is a high-cost reaction that requires a large amount of energy and time (for example, Non-Patent Document 1).

A harmful tin catalyst and various additives remain in the thus synthesized poly(lactic acid), and these foreign materials are very difficult to remove. In addition to linear products and cyclic products estimated from the reaction formula by the high-temperature and long-time reaction, various heterostructures such as branched structures and linear products having terminal groups other than hydroxy groups and carboxyl groups are further contained. Therefore, the resultant poly(lactic acid) cannot be said to be highly pure as polymer.

That is, when the poly(lactic acid) is used as a plastic material, heterostructures contained therein as impurities, similar to other condensed polymers, become severe problematic in the market to deteriorate mechanical properties and the like. In production of poly(lactic acid), heat history for a long time at high temperature is known to be a cause for increase in heterostructures (for example, Non-Patent Literature 2).

In each of these production methods, synthesis of lactic acid oligomer is the key to synthesize poly(lactic acid) since the reaction proceeds via lactic acid oligomer, and how lactic acid oligomers are efficiently synthesized exerts a significant influence on reduction in the cost of poly(lactic acid).

A lactic acid oligomer is utilized as an intermediate of poly(lactic acid), besides, it is found that the oligomer has, in addition to its high safety, an influencing action on an anaerobic glycolytic system that is an essential part of lipid metabolism and cancer cell energy metabolism, and that practical utilization of the lactic acid oligomer as an epoch-making functional food having an action of repairing and normalizing biotransformation in nutrition-associated diseases is initiated (see Non-Patent Document 3).

This lactic acid oligomer (molecular weight of 2000 or less) for functional food is introduced directly into the living body, and thus use of a toxic tin compound or the like therein should be voided as much as possible. Therefore, its synthesis is considerably troublesome in spite of its low molecular weight. At present, this oligomer is obtained by heating lactic acid for about 1 day under a reduced pressure followed by drying to give its powdered product. That is, the reaction time is so long that various heterostructures are easily produced as byproducts, thus raising problems in production and characteristics.

The lactic acid oligomers differ in physiological activities depending on whether they are in the form of linear or cyclic condensates, and such linear and cyclic condensates are estimated to be applied to products in remedy/prevention of different diseases when such lactic acid oligomers are utilized as, for example, functional food. Therefore, there is demand for development of techniques by which either linear or cyclic condensates can be distinctly produced or by which a product containing either dominantly is obtained.

The middle-molecular-weight lactic acid oligomer (molecular weight of about 5000 or more) is practically utilized as a sustained release pharmaceutical carrier. The drug release period by the middle-molecular-weight lactic acid oligomer is regulated by devices such as change in the molecular weight of the oligomer or copolymerization thereof with non-lactic-acid hydroxycarboxylic acids such as glycolic acid.

When the lactic acid oligomer is used in medical applications including sustained release pharmaceutical carriers, nonuse of harmful metal catalysts or minimum amount of byproduct impurities also become tasks to be attained from the viewpoint of safety.

If a method for producing a lactic acid oligomer with efficiency and safety by not using any harmful catalyst, solvent or additives could be found, accordingly, it would be possible to not only satisfy demand thereof as an intermediate of poly(lactic acid) but also to expect significant progress and enlargement of the industrial field thereof as a pharmaceutical and biological related material.

The present inventors have previously reported that when a metal catalyst such as tin, and microwave, are simultaneously used in the above-mentioned method of directly synthesizing poly(lactic acid), the polymerization rate increases 10-fold or more as compared with the prior art simple heating method, so that poly(lactic acid) having a molecular weight of about 20,000 is formed in only about 30 minutes (Non-Patent Document 4).

From the standpoint of strong possibility of easily giving the objective product at low cost in high yield in a short time in an environmentally sustainable manner, this prior method of directly synthesizing poly(lactic acid) is regarded as promising in industry.

However, this method is indented to synthesize high-molecular-weight poly(lactic acid) and is not related to a method for efficiently producing low-molecular-weight lactic acid oligomers wherein use of a metal catalyst such as tin is essential. It is reported that when such a catalyst is not present in this method, poly(lactic acid) is not be obtainable. Thus, there is no teaching of a method for synthesizing lactic acid oligomers safely and efficiently without using any harmful catalyst, solvent or additives.

Besides, a method of obtaining a lactic acid oligomer by polycondensation reaction of lactic acid in a household microwave oven has been proposed (Non-Patent Document 2). In this method, however, the primary structure of lactic acid oligomer cannot be regulated since the method is not capable of controlling temperature and has to be carried out under a normal pressure. Therefore, the lactic acid oligomer thus obtained by this method is poor in purity and is composed of a mixture of linear structures and cyclic structures with a large amount of structurally unclear components.

Non-Patent Document 1: "Poly(lactic acid)", Kobunshi Kankokai, 1997, p. 14.
Non-Patent Document 2: Macromol. Rapid Commun., 2001, 22, 1063
Non-Patent Document 3: Journal of Pharmacy, 126(3), p. 28-32 (2006)
Non-Patent Document 4: Macromol. Rapid Commun., 2007, 28, 437

DISCLOSURE OF INVENTION

Problems to be Solved by the Invention

The present invention has been made in view of the circumstances in the prior art described above, and the object of the present invention is to provide a method for producing a highly pure and hygienically safe lactic acid oligomer easily at low cost in a short time.

The present inventors have conducted extensive investigations on the aforementioned conventional problems in the method for producing the lactic acid oligomer, and as a result, they have arrived at a discovery that when an aqueous lactic acid solution is irradiated with microwave under a specific depressurization condition in the absence of a catalyst and a solvent, the polycondensation reaction is promoted as compared with the conventional heating method, and simultaneously the purity of the resulting lactic acid oligomer is made extremely high, thus leading to completion of the present invention.

That is, the present application provides the following aspects:

<1> a method for producing a lactic acid oligomer which comprises subjecting an aqueous lactic acid solution to a polycondensation reaction under microwave irradiation, wherein the polycondensation reaction is carried out under a reduced pressure in the absence of a polymerization catalyst and an organic solvent;
<2> the method for producing a lactic acid oligomer according to <1>, wherein the polycondensation reaction is carried out under a normal pressure at the initial stage and then carried out under a reduced pressure;
<3> the method for producing a lactic acid oligomer according to <1> or <2>, wherein the pressure is stepwise reduced to give a final pressure of 2000 Pa or less;
<4> the method for producing a lactic acid oligomer according to any one of <1> to <3>, wherein the content of cyclic lactic acid oligomer contained in the lactic acid oligomer is 0 to 4% by weight based on the total amount of the lactic acid oligomer; and
<5> the method for producing a lactic acid oligomer according to any one of <1> to <4>, wherein the content of linear lactic acid oligomer having a terminal group other than a hydroxyl group and a carboxyl group, contained in the lactic acid oligomer, is 0 to 4% by weight based on the total amount of the lactic acid oligomer.

Advantages of the Invention

According to the present invention, it is possible to produce a high-purity lactic acid oligomer hardly containing heterostructures and branched structures by a safe and easy method capable of suppressing the formation of cyclic oligomers in a short time.

BEST MODE FOR CARRYING OUT THE INVENTION

The method for producing a lactic acid oligomer which comprises subjecting an aqueous lactic acid solution to a polycondensation reaction under microwave irradiation according to the present invention is characterized by carrying out the polycondensation reaction under a reduced pressure in the absence of a polymerization catalyst and a solvent.

The lactic acid oligomer referred to in the present invention includes low-molecular-weight oligomers and middle-molecular-weight oligomers. The low-molecular-weight oligomer preferably has an average molecular weight $M_w$ of 400 to 5000 or, particularly preferably, 400 to 2000. The middle-molecular-weight oligomer preferably has an average molecular weight $M_w$ of 5000 to 20000 or, particularly preferably, 5000 to 10000.

The aqueous lactic acid solution used as a raw material is not particularly limited and may be D-lactic acid, L-lactic acid or DL-lactic acid. Preferably, a commercially available aqueous lactic acid solution is used. These lactic acids may be used alone or as a mixture of two or more thereof.

This polycondensation reaction is carried out under microwave irradiation. Although the power of microwave is not particularly limited, an apparatus with a maximum power of 300 W to 10 kW is desirably used. In this case, microwave may be continuously applied, but the reaction system is rapidly increased to a desired temperature by irradiation. Therefore, irradiation of microwave may not be necessary continuous but intermittent. After the polymerization reaction temperature reaches the optimum value, it is desirable that microwave power should be regulated so as to maintain the predetermined temperature.

The usable magnetron frequency of microwave irradiation is about 300 MHz to 300 GHz but, from the viewpoint of easy availability, apparatuses with a frequency of about 2,450 MHz are preferably used.

The reaction pressure in this polycondensation reaction may, at an early reaction stage, be ordinary pressure to prevent evaporation of monomers or oligomers. With the progress of the polymerization, however, the influence of reverse reaction increases and, after a certain polymerization stage, the degree of polymerization is hardly increased. To prevent such a situation, it is preferable that the reaction system should be depressurized after the initial polycondensation reaction is finished. Then, it is desirable that the final pressure should be set at 2000 Pa or less. This is because more efficient removal of water is necessary for progress of polycondensation reaction without using a catalyst, and the pressure described above is minimum required to carried out the polymerization reaction under the temperature conditions in the present invention.

The aspect adopted preferably in the present invention is to carry out the initial stage of polycondensation reaction under a normal pressure, and thereafter, to carry out the reaction under a reduced pressure. The initial polycondensation reaction implied here means the period until the average molecular weight $M_w$ reaches about 400, that is, the polymerization proceeds to about a pentamer.

The time of terminating the initial polycondensation reaction can be determined as a time point at which distillation of water is almost finished under a normal pressure.

After the initial polycondensation reaction is finished, the system is depressurized, but rapid depressurization is unfavorable because it causes evaporation of monomers or oligomers of a tetramer or so remaining in the polymerization system. Thus, it is preferable to decrease the pressure stepwise. For example, the reaction system is depressurized gradually to about 10000 Pa over 5 minutes after initiation of depressurization, then to 4000 Pa over next 5 minutes, and to 1000 Pa over next 10 minutes desirably. This polycondensation reaction is carried out at a reaction pressure decreased under a reduced pressure in this manner, and the reaction is carried out at a final reaction pressure of 2000 Pa, preferably 1400 Pa or less or, most preferably 100 Pa or less.

By applying such specific depressurization conditions in the present invention, a high-purity lactic acid oligomer can be obtained in high yield even in the absence of a polymerization catalyst or organic solvent.

The reaction time is not particularly limited, but is preferably in the range of 5 to 60 minutes. When the degree of polymerization is to be further increased, the pressure should be decreased and the reaction time should be prolonged while, when the degree of polymerization is to be decreased, the pressure should be increased and the reaction time should be shortened; in this manner, the quality of the lactic acid oligomer can be regulated by combination of the conditions described above.

The polymerization temperature is not particularly limited but, in view of the regulation and control of the qualities for products, should be set preferably between 100 and 250° C.

or, more preferably, between 140 and 200° C. At a temperature of less than 100° C., the polymerization reaction may not proceed while, at a temperature of higher than 250° C., heterostructures may be formed in the objective product so as to proceed to unfavorable side effects that the desired product cannot be obtained or coloration of the product may be caused. Depending on the polymerization temperature, the composition of the linear or cyclic structure of the product can be changed. Even at a temperature where the formation of cyclic products has been said to be easily promoted in the prior art, linear products can be selectively obtained by utilizing the characteristics of the microwave reaction by which the product is not subjected to rapid and extreme heat history.

By applying the polymerization method described above, oligomers having an average molecular weight $M_w$ of 400 to 5000 for the low-molecular-weight oligomer or oligomers having an average molecular weight $M_w$ of 5000 to 20000 for the middle-molecular-weight oligomer, which are highly pure lactic acid oligomers substantially free of other impurities, wherein the content of cyclic lactic acid oligomer is 0 to 4% by weight based on the total amount of the lactic acid oligomer and the content of linear lactic acid oligomer having a terminal group other than a hydroxyl group and a carboxyl group is 0 to 4% by weight based on the total amount of the lactic acid oligomer, can be obtained in high yield.

Although the synthesis procedure is riot particularly limited, a typical method is shown below.

Lactic acid as a raw material for the reaction is supplied to a polymerization reactor. Stirring is not always necessary, but may be carried out to obtain a uniform product. The reaction may be carried out in air, but may be carried out in an inert gas such as nitrogen to prevent formation of byproducts. As the reaction proceeds, the released water is distilled away, and thus an air exhaust is attached to remove the water. Simultaneously, an inert gas such as nitrogen may be introduced to the reaction system to promote distillation of water.

INDUSTRIAL APPLICABILITY

In the present invention, a highly pure lactic acid oligomer of a linear structure having only terminals of a hydroxyl group and a carboxyl group can be produced by an easy method of microwave heating in a short time.

Particularly, a highly pure lactic acid oligomer can be produced in a short time without using harmful metal catalysts such as a tin compound and organic solvents such as a hydrocarbon and a hydrocarbon halide. Therefore, it is no exaggeration to say that the method of the present invention is an optimum method for industrial production of a highly pure lactic acid oligomer free from additives, organic solvent residues and heterostructures.

Then, this highly pure lactic acid oligomer can be utilized particularly as safe and highly pure intermediate of poly (lactic acid) suitable for a pharmaceutical intermediate and a pharmaceutically and biologically relevant material as well as a functional food that is safe as it is, and has various advantages such as improved safety and increased utility of these products.

EXAMPLES

Hereinafter, the present invention will be described in more detail by reference to Examples, but the present invention is not limited to these examples.

Example 1

An air exhaust (oil-sealed rotary pump) was connected to a heat-resistant glass reactor of a capacity of 300 mL equipped with a mechanical stirrer. Into the reactor, 255.7 g of 86.4% aqueous L-lactic acid solution was introduced and then subjected to a reaction with a cavity-type microwave irradiator having a frequency of 2450 MHz and a maximum power of 1.5 kW in a nitrogen atmosphere. The microwave power was set to be regulated at a predetermined temperature. Initially, the reactant was heated under stirring at a normal pressure by stepwise increasing the temperature from room temperature to 200° C. in increments of about 20° C. per minute and then further stirred for 15 minutes keeping the temperature at 200° C. Thereafter, the reaction system was depressurized over about 20 minutes and finally reduced to 1400 Pa. Irradiation was continued for further 10 minutes to obtain a colorless transparent product having a high viscosity. The yield was 75%.

Analysis of the average molecular weight of the resulting lactic acid oligomer was performed by MALDI-TOFMS to find that the $M_w$ was 1070 and $M_n$ was 960.

All of this lactic acid oligomer was soluble in solvents such as chloroform and acetonitrile. Its GPC chart showed a monomodal distribution and suggested that the lactic acid oligomer was free of impurity structures such as branch.

Figure 1:
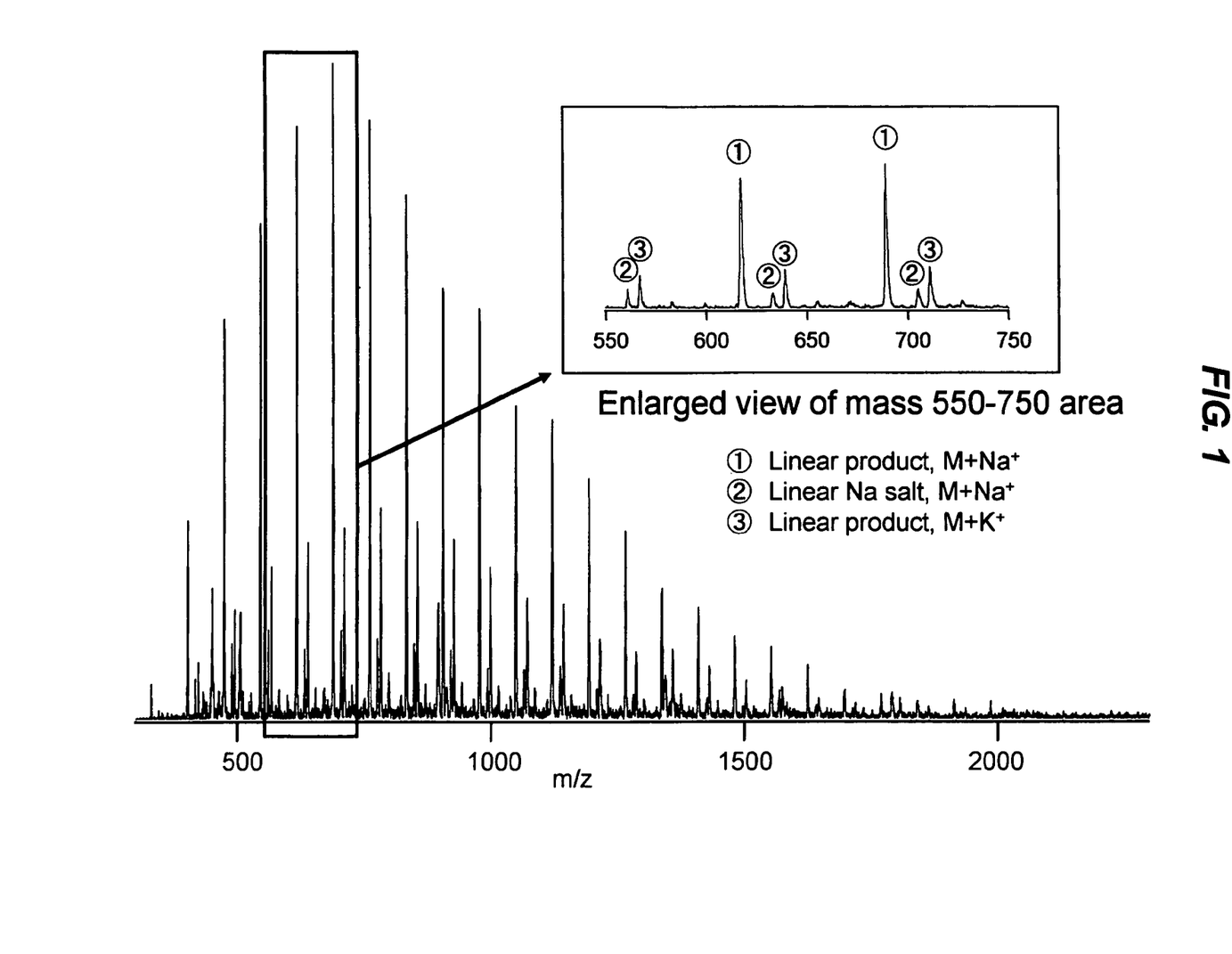
FIG. 1 is a MALDI-TOFMS analysis spectrum of the lactic acid oligomer obtained in Example 1.

The result of analysis of the lactic acid oligomer by MALDI-TOFMS is shown in FIG. 1. As seen from the analysis spectrum in FIG. 1, the fundamental unit of this lactic acid oligomer was almost linear and had a linear structure/cyclic structure constitutional ratio of 99.1/0.9 (molar ratio which is equivalent to weight ratio in this example). A linear structure other than terminals of a hydroxyl group and a carboxyl group was not detected. The lactic acid monomer recovered in the distillate component was 6.1 g.

Example 2

An air exhaust (oil-sealed rotary pump) was connected to a heat-resistant glass reactor of a capacity of 100 mL equipped with a mechanical stirrer. Into the reactor, 34.8 g of 86.4% aqueous L-lactic acid solution was introduced and subjected to a reaction with a focused single mode type microwave irradiator having a frequency of 2450 MHz and a maximum power of 300 W in a nitrogen atmosphere. The microwave power was regulated manually in order to operate at a predetermined temperature. Initially, the temperature of the reactant was gradually increased from room temperature to 180° C. over about 15 minutes under stirring at a normal pressure and then further stirred 45 minutes while keeping the temperature at 180° C. Thereafter, the reaction system was depressurized over about 25 minutes and finally reduced to 150 Pa. Irradiation was continued under the same condition and the reaction was terminated taking 720 minutes after irradiation of the microwave was initiated, whereby a colorless transparent solid product was obtained. The yield was 95%.

Analysis of the average molecular weight of the resulting lactic acid oligomer was performed by GPC to find that the $M_w$ was 6800 and $M_n$ was 3500.

All of this lactic acid oligomer was soluble in chloroform. Its GPC chart showed a monomodal distribution and suggested that the lactic acid oligomer was free of impurity structures such as branch.

Figure 2:
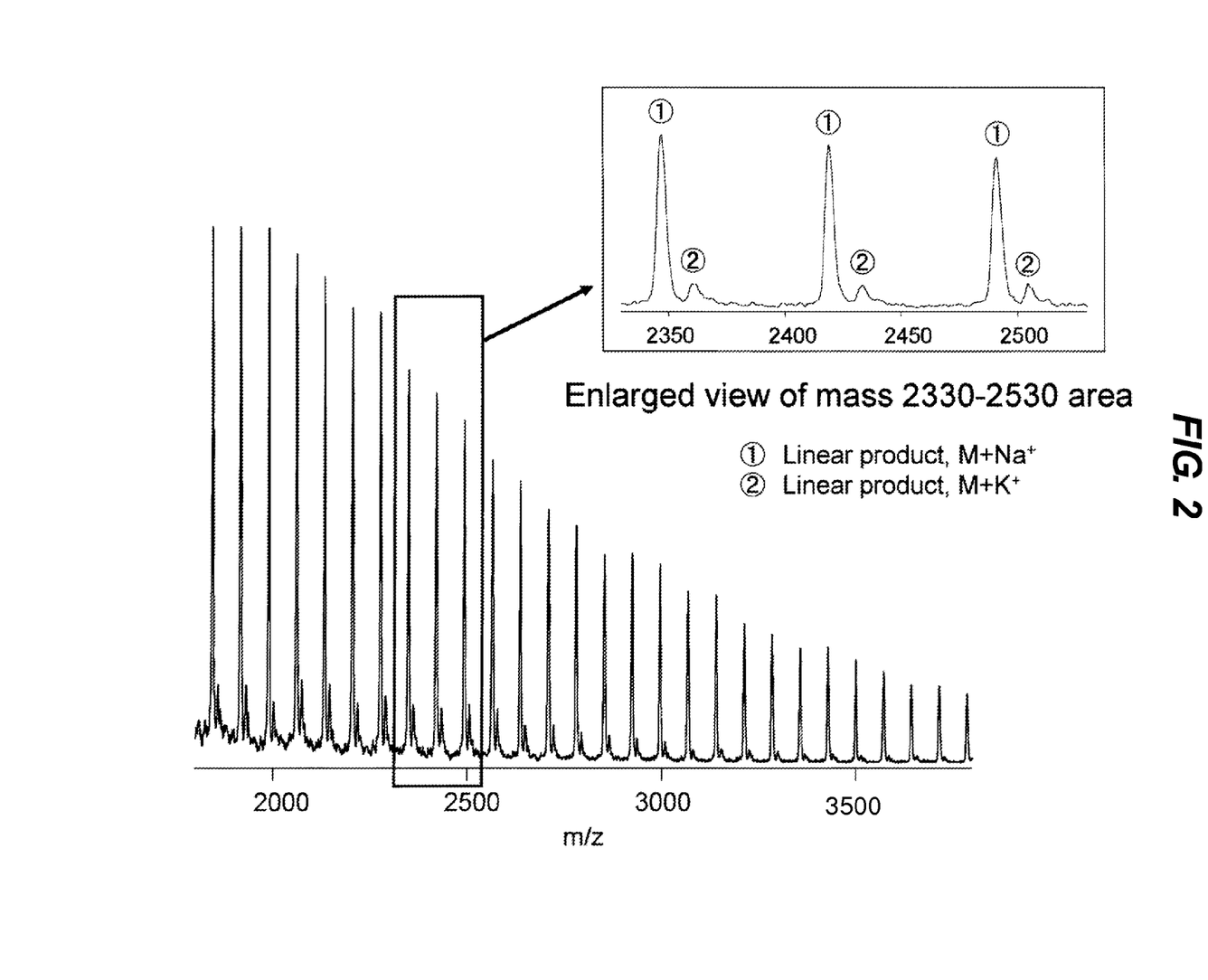
FIG. 2 is a MALDI-TOFMS analysis spectrum of the lactic acid oligomer obtained in Example 2.

The result of analysis of this lactic acid oligomer by MALDI-TOFMS is shown in FIG. 2. As seen from the analysis spectrum in FIG. 2, the fundamental unit of this lactic acid oligomer was completely linear. A linear structure other than terminals of a hydroxyl group and a carboxyl group was not detected.

Comparative Example 1

500 ML of an aqueous L-lactic acid solution was stepwise heated in a nitrogen stream under the increment conditions of 140° C./100,000 to 4000 Pa for 2 hours and then further heated at 140° C./1300 Pa for 3 hours, thereby giving about 350 g of a colorant transparent lactic acid oligomer (yield 85%).

Analysis of the average molecular weight of the resulting lactic acid oligomer was performed by MALDI-TOFMS to find that the $M_w$ was 1110 and $M_n$ was 1000.

Figure 3:
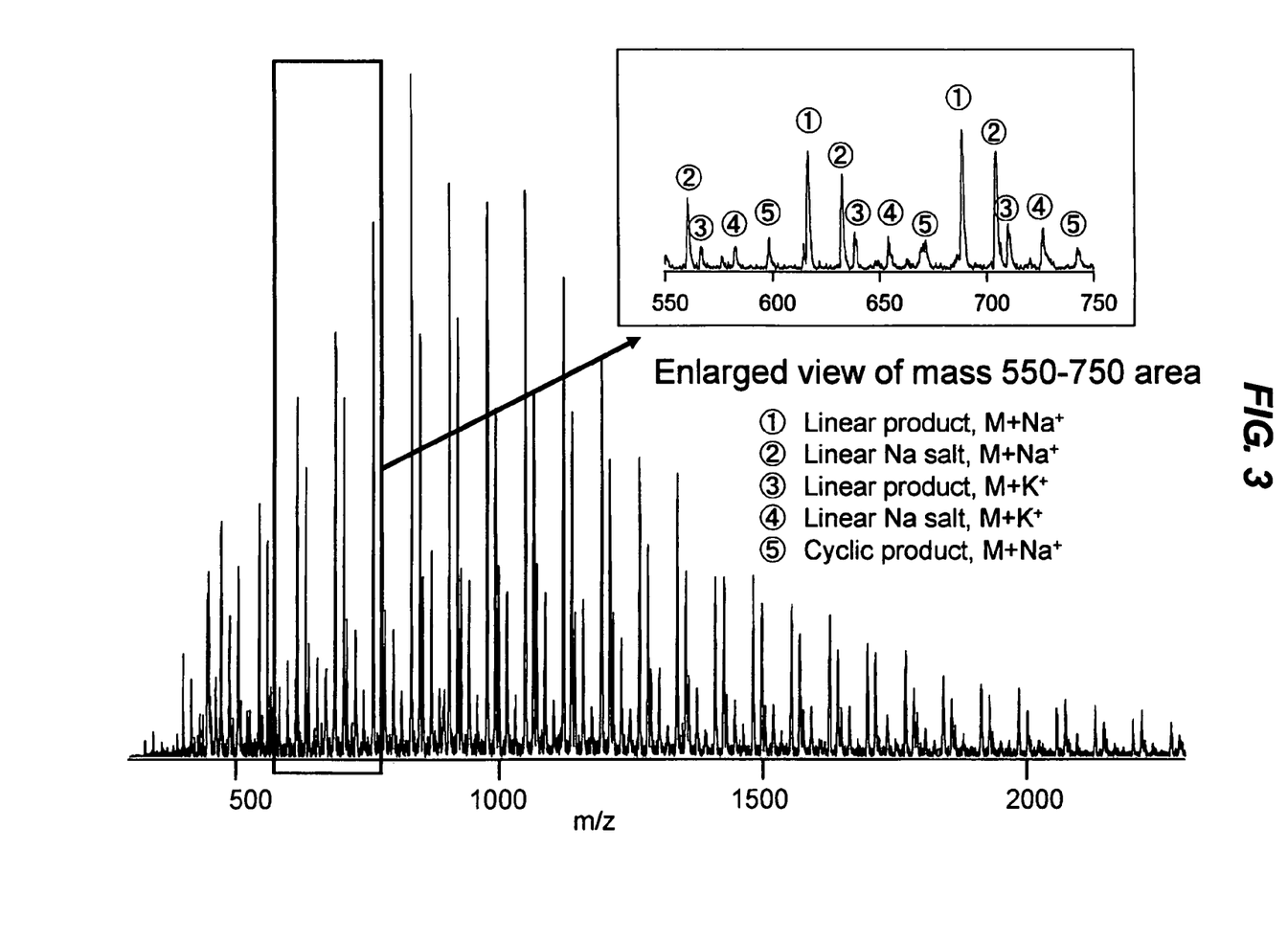
FIG. 3 is a MALDI-TOFMS analysis spectrum of the lactic acid oligomer obtained in Comparative Example 1.

The result of analysis of this lactic acid oligomer by MALDI-TOFMS is shown in FIG. 3. As seen from the analysis spectrum in FIG. 3, the fundamental unit of this lactic acid oligomer was almost linear and had a linear structure/cyclic structure constitutional ratio of 95.8/4.2 (molar ratio which is equivalent to weight ratio in this example). A linear structure other than terminals of a hydroxyl group and a carboxyl group was not detected.

Comparative Example 2

A 4.95 g portion of 86.4% aqueous L-lactic acid solution was placed in a heat-resistant glass beaker of 30 cc, then placed in the middle of a turntable of a microwave oven (National NE-EH2) and heated with a power of 500 W for 30 minutes. The product was a transparent light-brown solid, and the yield was 39%.

Analysis of the average molecular weight of the resulting lactic acid oligomer was performed by MALDI-TOFMS to find that the $M_w$ was 1530 and $M_n$ was 1340.

Figure 4:
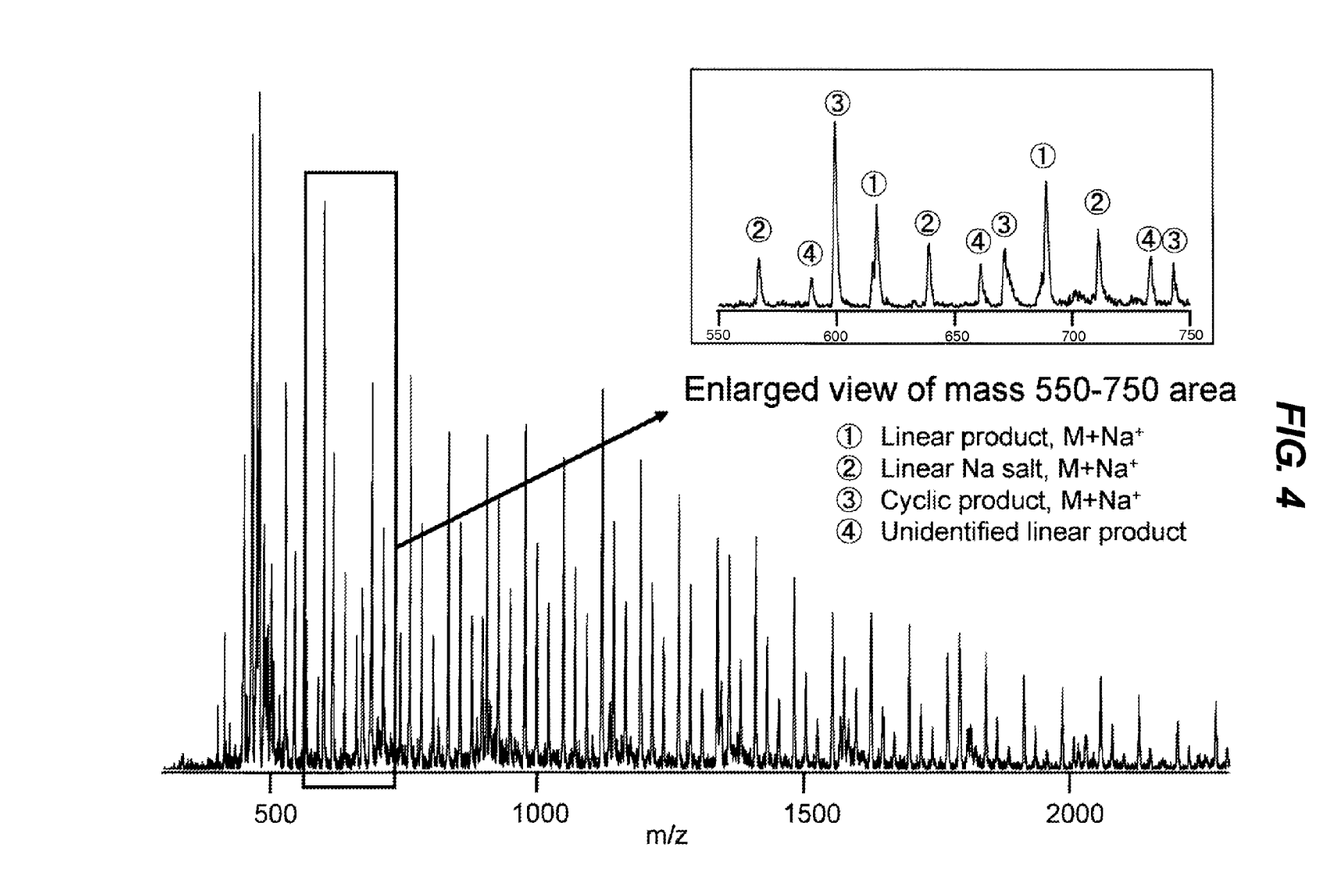
FIG. 4 is a MALDI-TOFMS analysis spectrum of the lactic acid oligomer obtained in Comparative Example 2.

The result of MALDI-TOFMS is shown in FIG. 4. As seen from the analysis spectrum of FIG. 4, three types of fundamental units in this oligomer were present and attributed to as follows:
1. linear product having a hydroxyl group at one terminal side and a carboxyl group at another terminal side (73.04%);
2. unidentified linear product (15.53%); and
3. cyclic product (11.43%);
(mol % which is equivalent to % by weight in this example).

The invention claimed is:
1. A method for producing a lactic acid oligomer which comprises subjecting an aqueous lactic acid solution to a polycondensation reaction under microwave irradiation, wherein the polycondensation reaction is carried out in the absence of a polymerization catalyst and an organic solvent under a normal pressure at an initial stage and then the pressure is stepwise reduced to give a final pressure of 2000 Pa or less, and wherein a polymerization temperature is between 100° and 250° C.
2. The method for producing a lactic acid oligomer according to claim 1, wherein the content of cyclic lactic acid oligomer contained in the lactic acid oligomer is 0 to 4% by weight based on the total weight amount of the lactic acid oligomer.
3. The method for producing a lactic acid oligomer according to claim 1, wherein the content of linear lactic acid oligomer having a terminal group other than a hydroxyl group and a carboxyl group, contained in the lactic acid oligomer, is 0 to 4% by weight based on the total weight amount of the lactic acid oligomer.

* * * * *